United States Patent [19]

Dshkhunian et al.

[11] Patent Number: 4,482,950
[45] Date of Patent: Nov. 13, 1984

[54] SINGLE-CHIP MICROCOMPUTER

[76] Inventors: Valery L. Dshkhunian, K-482, korpus 338A, kv. 73; Eduard E. Ivanov, 14 Parkovaya ulitsa, 16, kv. 6; Sergei S. Kovalenko, k-498, korpus 421, kv. 3; Pavel R. Mashevich, k-482, korpus 338A, kv. 139; Jury E. Chicherin, K-460, korpus 161, kv. 31, all of Moscow, U.S.S.R.

[21] Appl. No.: 307,942

[22] Filed: Sep. 24, 1981

[51] Int. Cl.³ .................. G06F 13/00; G06F 9/22
[52] U.S. Cl. .................................................. 364/200
[58] Field of Search ........................... 364/200, 900

[56] References Cited

U.S. PATENT DOCUMENTS

| 3,710,324 | 1/1973 | Cohen et al. | 364/200 |
| 4,228,496 | 10/1983 | Katzman et al. | 364/200 |
| 4,387,424 | 6/1983 | Frediani et al. | 364/200 |

OTHER PUBLICATIONS

MCS-48 Microcomputer User's Manual, Intel Corporation, 1976.
Analog and Digital Integrated Circuits ed. by S. V. Yakubovsky Sovietskoye Radio Publishers, 1979, p. 178.
Microprocessors and Microcomputers, by B. Souchek, Sovietskoye Radio Publishers, 1979, p. 419.
Microcomputer Handbook, Digital Equip. Corp., 1976 pp. 4-52, 4-53 and also pp. 4-13, 4-14.
B. M. Kagan & M. M. Kanevsky, Digital Computers and Systems, Energia Publishers, 1974 pp. 466-467.

Primary Examiner—Harvey E. Springborn
Attorney, Agent, or Firm—Lilling & Greenspan

[57] ABSTRACT

A single-chip microcomputer comprises a processor incorporating a computation process control unit and an operation execution unit. The microcomputer further comprises a memory unit, an interface, a buffer storage cell, and a unit to control exchange of information transmitted through a system line. All these units and the processor with its computation process control unit and operation excution unit are interconnected by a bidirectional bus. The processor also includes a buffer storage cell, a processor information exchange control unit, and an address comparator, which are all interconnected. The single-chip microcomputer further contains a bus arbiter and a system line arbiter which are connected to the unit to control exchange of information transmitted through the system line. Finally, the microcomputer includes a system line address comparator connected to the processor and buffer storage cell. The single-chip microcomputer according to the invention can be combined into a system with a common memory field.

4 Claims, 5 Drawing Figures

SINGLE-CHIP MICROCOMPUTER

BACKGROUND OF THE INVENTION

1. Field of the Invention

The present invention relates to digital computers and, more particularly, to a single-chip microcomputer.

The invention is best applicable to the provision of high-efficiency multiprocessor computing systems with a common memory field.

The invention is also applicable to process control systems and NC machine tools.

2. Description of the Prior Art

There is known a computer (cf. U.S. Pat. No. 3,710,324) comprising a processor, a memory and at least one peripheral unit having a means to generate a request in case of readiness. All these units are interconnected by a common bus. Combining such computers into a multiprocessor system is impossible without additional units. A combined system is poorly coupled and displays an improved efficiency only in solving a combination of problems, but not in solving an individual problem.

Single-chip microcomputers constructed as large scale integrated circuits have a number of important advantages. They are small in size, highly reliable and have a low power input; they are also cheap and versatile. At the same time the capacity of such microcomputers is insufficient for solving a number of problems. This necessitates combining single-chip microcomputers into a high-capacity multiprocessor computing system. In order to make such a system efficient in solving not only a combination of problems, but also individual problems, it is necessary that the system be provided with a common memory field accessible to all the processors it contains. It is also necessary that the capacity of the system increase in proportion to the amount of hardware.

From the technical standpoint, the closest prototype of the present invention is a single-chip microcomputer (cf. MCS-48. Microcomputer User's Manual, 1976, by Intel Corporation, 3065 Bowers Avenue, Santa Clara, Calif. 95051) comprising a computation process control unit and an operation execution unit. The computation process control unit is intended to decode instructions and form sequences of microinstructions to control microprocessor units. The microcomputer further incorporates a memory unit, an interface to connect the microcomputer to peripheral devices, a buffer storage cell, and a unit to control exchange of information transmitted through a system line. All the above units are interconnected by a bidirectional bus. The unit to control exchange of information transmitted through the system line forms signals to control the buffer storage cell and coordinates the order of exchange of information transmitted through the bidirectional bus and the system line.

A first output of the unit to control exchange of information transmitted through the system line is connected to a control input of the buffer storage cell. An input/output of the buffer storage cell, a first input/output of the unit to control exchange of information transmitted through the system line, and an input/output of the interface are a first input/output, a second input/output and a third input/output, respectively, of the single-chip microcomputer.

The memory unit of the single-chip microcomputer under review comprises a random-access memory and a read-only memory. The processor of the single-chip microcomputer comprises a program counter whose output is connected to an input of the interface and to an input of the read-only memory.

It is impossible to combine several single-chip microcomputers of this type into a multiprocessor system with a common memory field. The functional potentialities of such a microcomputer can be expanded through the use of more memory units, but this makes it harder to integrate single-chip microcomputers into a multiprocessor system and calls for additional peripheral equipment.

SUMMARY OF THE INVENTION

It is an object of the present invention to provide a versatile single-chip microcomputer such that several single-chip microcomputers can be integrated into a high-capacity multiprocessor system with a common memory field.

The invention consists in providing a single-chip microcomputer comprising a bidirectional bus to interconnect a processor intended for data processing and containing a computation process control unit to decode instructions and form sequences of microinstructions to control processor units, and an operation execution unit, the latter and the computation process control unit being interconnected, and a memory, an interface to connect the single-chip microcomputer to peripheral devices, a buffer storage cell, a unit to control exchange of information transmitted through a system line, which forms signals to control the buffer storage cell and determines the order of exchange of information transmitted through the bidirectional bus and the system line, a first input of the unit to control exchange of information transmitted through the system line being connected to a control unit of the buffer storage cell, an input/output of the buffer storage cell, a first input/output of the unit to control exchange of information transmitted through the system line, and an input/output of the interface being a first input/output, a second input/output and a third input/output, respectively, of the single-chip microcomputer, characterized, according to the invention, in that the processor contains a buffer storage cell for temporary storage and transmission of data and data addresses through the bidirectional bus to the first input/output of the single-chip microcomputer, a processor information exchange control unit intended to control the buffer storage cell and form data and data address accompanying signals and identifiers transmitted through the bidirectional bus according to exchange instructions formed by the computation process control unit, and an address comparator to select units of the single-chip microcomputer according to the address stored by the buffer storage cell, the address comparator being connected to the buffer storage cell, an output of the computation control unit being connected to a first input of the processor information exchange control unit whose first output is connected to a control input of the buffer storage cell having its first input/output connected to an input/output of the operation execution unit, while its second input/output and an input/output of the processor information exchange control unit are connected to the bidirectional bus, the single-chip microcomputer further including a bus arbiter to identify a priority unit which requests for a cycle of exchange through the bidirectional bus, the bus arbiter being connected to second outputs of the processor information exchange control unit and the unit to control exchange of information transmitted through the system line, and being intended to form enabling signals at its outputs for borrowing a cycle of exchange through the bidirectional bus, and a system line arbiter which makes it possible to use the system line at different time intervals, a first input and a first output of the bus arbiter being connected to a second output and a second input of the processor information exchange control unit, a second input and a second output of the bus arbiter being connected to a second output and a first input of the unit to control exchange of information transmitted through the system line, while its second input and third output are connected to a first output and a first input of the system line arbiter whose group of inputs and outputs is a group of inputs and outputs of the single-chip microcomputer whereof a first input is the second input of the system line arbiter, the single-chip microcomputer further containing a system line address comparator intended to select units of the single-chip microcomputer according to the address stored by the buffer storage cell, a first input of the system line address comparator being connected to an output of the buffer storage cell, second inputs of the address comparator and the system line address comparator being combined and connected to inputs of the memory unit and interface and to a third input of the unit to control exchange of information transmitted through the system line.

It is expedient that the system line arbiter should contain a distributed arbitration unit whose first input is the first input of the system line arbiter, while its second input is connected to an output of a first AND gate, a first output of the distributed arbitration unit being a first output of the group of inputs and outputs of the system line arbiter, a first input of the group of inputs and outputs of the system line arbiter being a third input of the distributed arbitration unit whose second output is a second output of the group of inputs and outputs of the system line arbiter, a third output and a fourth output of the distributed arbitration unit being connected to first inputs of a first OR gate and a second OR gate, respectively, the system line arbiter also including a concentrated arbitration unit whose first input is the first input of the system line arbiter, while its second input is connected to an output of a second AND gate whose first and second inputs are connected to outputs of a first inverter and a second inverter, respectively, a third input of the second AND gate and an input of the first inverter being a second input and a third input, respectively, of the group of inputs and outputs of the system line arbiter, a third input and a fourth input of the concentrated arbitration unit being a first input and a fourth input, respectively, of the group of inputs and outputs of the system line arbiter, a first output and a second output of the concentrated arbitration unit being connected to a first input of a third AND gate and to a second input of the first OR gate whose output is a third output of the group of inputs and outputs of the system line arbiter, whose first input is connected to a first input of the first AND gate, while its second input is connected to a second input of the first AND gate and to an input of the second inverter whose output is connected to a second input of a third AND gate having its output connected to a second input of a second OR gate whose output is an output of the system line arbiter.

It is preferable that the bus arbiter should contain a priority circuit whose first and second inputs are connected to the first input and the second input, respectively, of the bus arbiter, a first output and a second output of the priority circuit being connected to first inputs of a first AND gate and a second AND gate whose outputs are connected to the first and second outputs of the bus arbiter, second inputs of the AND gates being connected to an output of a NOR gate whose inputs are connected to those of the bus arbiter.

It is expedient that the processor information exchange control unit should contain a first flip-flop whose first input is the first input of the processor information exchange control unit, an output of the first flip-flop being a second output of the processor information exchange control unit whose second input is a first input of a second flip-flop whose output is connected to an input of a delay circuit and to a second input of the first flip-flop and is also the first output and the second input/output of the processor information exchange control unit, an output of the delay circuit being connected to first inputs of three AND gates, second inputs of the first and second AND gates being connected to the first input of the processor information control unit, while their outputs are connected to the first input and the input/output of the processor information exchange control unit whose input/output is connected to a second input of the third AND gate having its output connected to a second input of the second flip-flop.

The invention provides a single-chip microcomputer which is more versatile, as compared to conventional single-chip microcomputers, and which makes it possible to combine several single-chip microcomputers into a high-capacity system with a common memory unit. The capacity of such a system increases in proportion to the number of single-chip microcomputers, due to independent exchange of information through the bus. At the same time the information stored by the memory unit of each microcomputer is accessible to the processor of any single-chip microcomputer incorporated in the system. It is important that such a system incorporates identical single-chip microcomputers. The division of address space zones and the distribution of functions of the system line arbiter are effected according to codes at the inputs of the single-chip microcomputers contained in the system. A demand for large quantities of identical single-chip microcomputers is bound to cut down their price.

The single-chip microcomputer according to the invention is an integrated circuit with n-channel MOS devices and polycrystalline silicon gates. The microcomputer can execute more than 400 different instructions, including modifications. The execution time is 2 microseconds for register to register operations and 36 microseconds for such long operations as multiplication.

BRIEF DESCRIPTION OF THE ACCOMPANYING DRAWINGS

Other objects and advantages of the present invention will become more apparent from a consideration of the following detailed description of a preferred embodiment thereof, taken in conjunction with the accompanying drawings, wherein.

DESCRIPTION OF THE PREFERRED EMBODIMENT

Referring to the attached drawings, a single-chip microcomputer according to the invention comprises a bidirectional bus 1 (FIG. 1), a processor 2 intended for data processing and containing a computation process control unit 3 and an operation execution unit 4 which are interconnected, and a memory unit 5, an interface 6 to connect the single-chip memory to peripheral devices, a buffer storage cell 7, and a unit 8 to control exchange of information transmitted through a system line. All these units and the processor 2 are interconnected by the bidirectional bus 1. A first output 9 of the unit 8 to control exchange of information transmitted through a system line is connected to a control input of the buffer storage cell 7. An input/output of the buffer storage cell 7, an input/output of the unit 8 to control exchange of information transmitted through a system line, and an input/output of the interface 6 are a first input/output 10, a second input/output 11, and a third input/output 12, respectively, of the single-chip microcomputer.

Figure 1:
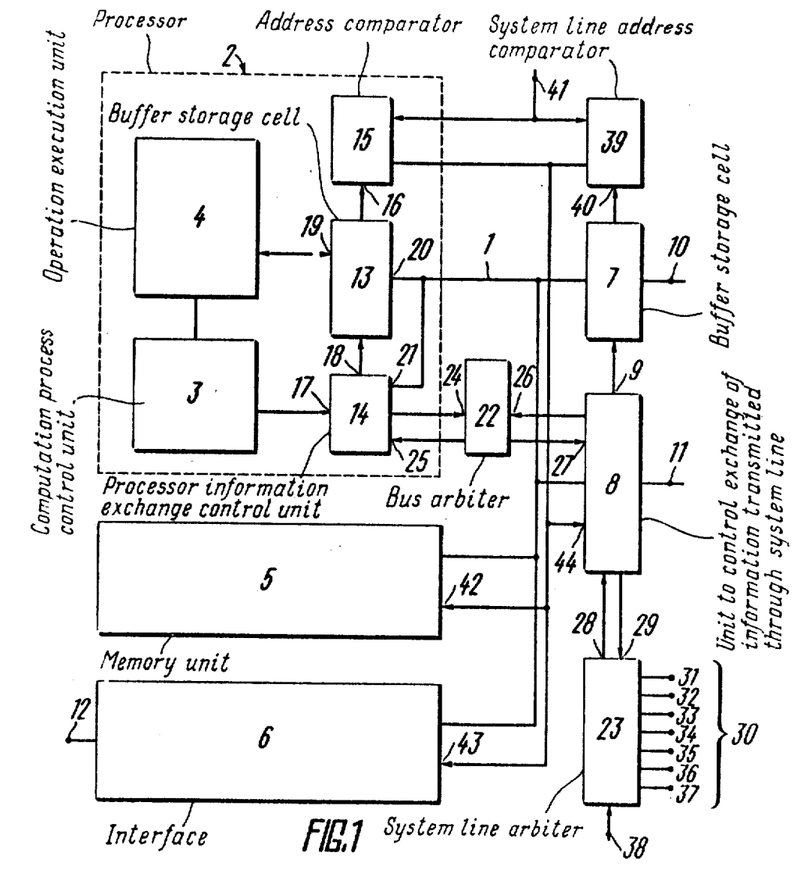
FIG. 1 is a block diagram of a single-chip microcomputer in accordance with the invention.

The memory unit 5 comprises a random access memory (not shown) with a capacity of 128 sixteen-digit words, and a read-only memory (not shown) with a capacity of 1K sixteen-digit words, where K=1024. The address space zone of the memory only accounts for a small fraction of the over-all address space, because the 16-bit length of address makes it possible to address up to 64K words.

The interface 6 comprises two addressable registers, as well as electric level matching circuits (not shown) which ensure a required power of signals. The registers occupy two addresses in the address space zone.

The processor 2 performs a standard set of computing operations and controls the computation process. It comprises the computation process control unit 3 and the operation execution unit 4 which are interconnected. The operation execution unit 4 comprises an arithmetic-logic device which performs such operations as AND, OR, EXCLUSIVE OR, addition, subraction, and right and left shifts on sixteen-digit words of a rapid access memory (not shown). The arithmetic-logic device comprises registers some of which are general-purpose registers, while others perform auxiliary functions, such as those of a program counter, stack pointer, and temporary storage register. In addition, the operation execution unit 4 contains a processor status register and a logic means to form condition codes; these are provided with synchronization circuits (not shown). The computation process control unit 3 comprises an instruction register, a microprogram control unit, means to effect conditional transfers and means to respond to interruptions (not shown). The computation process control unit 3 forms a sequence of microinstructions to control processor units so as to perform different functions as required.

The processor 2 further includes a buffer storage cell 13 (cf. Analogoviye i tsifroviye integralniye skhemy/Analog and Digital Integrated Circuits/, ed. by S. V. Yakubovsky, Sovietskoye Radio Publishers, 1979, p. 178) and a processor information exchange control unit 14 intended to control the buffer storage cell 13 and to form data and data address accompanying signals and identifiers according to an algorithm of exchange through the bidirectional bus 1 and according to an exchange instruction formed by the computation process control unit 3. Finally, the processor 2 includes an address comparator 15 (cf. B. Souchek, Microprocessory i micro-EVM/Microprocessors and Microcomputers/, Sovietskoye Radio Publishers, Moscow, 1979, p. 419). A first input 16 of the address comparator 15 is connected to an output of the buffer storage cell 13. An output of the computation process control unit 3 is connected to a first input 17 of the processor information exchange control unit 14 whose first output 18 is connected to a control input of the buffer storage cell 13. A first input/output 19 of the buffer storage cell 13 is connected to an input/output of the operation execution unit 4. A second input/output 20 of the buffer storage cell 13 and an input/output 21 of the processor information exchange control unit 14 are connected to the bidirectional bus 1.

The single-chip microcomputer according to the invention further includes a bus arbiter 22 and a system line arbiter 23 which are intended to solve conflicting problems that may arise on the bidirectional bus 1 and the system line. A first input 24 and a first output of the bus arbiter 22 are connected to a second output and a second input 25, respectively, of the process information exchange control unit 14. A second input 26 and a second output of the bus arbiter 22 are connected to a second output and a first input 27, respectively, of the unit 8 to control exchange of information transmitted through the system line. A second input and a third output of the unit 8 to control exchange of information transmitted through the system line are connected to a first output 28 and an input 29 of the system line arbiter 23. The group of inputs and outputs of the system line arbiter 23 is a group 30 of inputs and outputs of the single-chip microcomputer, which comprises four inputs, 31, 32, 33 and 34, and three outputs, 35, 36 and 37. A first input 38 of the single-chip microcomputer is the second input of the system line arbiter 23. The single-chip microcomputer further contains a system line address comparator 39 whose first input 40 is connected to the output of the buffer storage cell 7. Second inputs of the address comparator 15 and those of the system line address comparator 39 are connected to a second input 41 of the single-chip microcomputer. Outputs of the address comparators 15 and 39 are combined and connected to inputs 42 and 43 of the memory unit 5 and interface 6 and to a second input 44 of the unit 8 to control exchange of information transmitted through the system line.

The system line arbiter 23 comprises a distributed arbitration unit 45 (FIG. 2) (cf. Microcomputer Handboook, 1976, by Digital Equipment Corporation, Maynard, Mass., pp. 4-52, 4-53). A first input of the distributed arbitration unit 45 is the first input 29 of the system line arbiter 23 (FIG. 1). A second input 46 (FIG. 2) of the unit 45 is connected to an output of a first AND gate 47. A first output 48 of the distributed arbitration unit 45 is the first output of the group of inputs and outputs of the system line arbiter 23 (FIG. 1) and is connected to the first output 35 of the group 30 of inputs and outputs of the single-chip microcomputer.

A first input of the group of inputs and outputs of the system line arbiter 23 is a third input 49 (FIG. 2) of the distributed arbitration unit 45 and is connected to the first input 31 (FIG. 1) of the group 30 of inputs and outputs of the single-chip microcomputer. A second output 50 (FIG. 2) of the distributed arbitration unit 45 is the second output of the group of inputs and outputs of the system line arbiter 23 (FIG. 1) and is connected to the second output 36 of the group 30 of inputs and outputs of the single-chip microcomputer. A third output 51 and a fourth output 52 (FIG. 2) of the distributed arbitration unit 45 are connected to inputs of a first OR gate 53 and a second OR gate 54, respectively.

Figure 4:
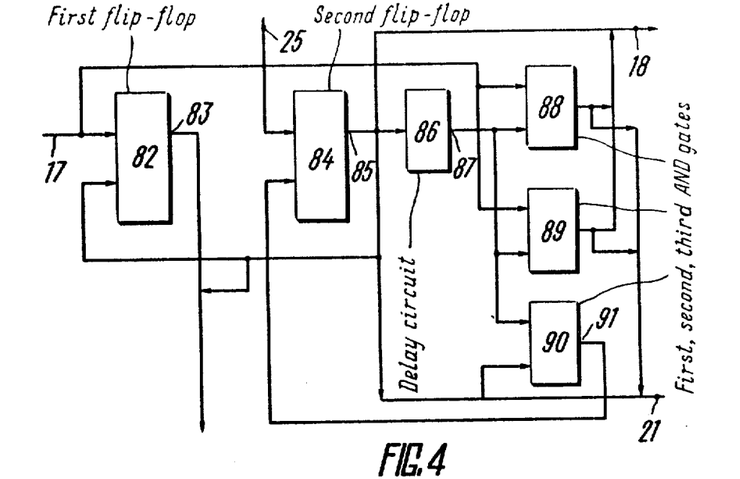
FIG. 4 is a functional diagram of a processor information exchange control unit in accordance with the invention.

The system line arbiter 23 (FIG. 4) further contains a concentrated arbitration unit 55 (FIG. 2) (cf. Microcomputer Handbook, 1976, by Digital Equipment Corporation, Maynard, Mass., pp. 4-13, 4-14) whose first input is connected to the first input 29 of the system line arbiter 23 (FIG. 1). A second input 56 (FIG. 2) of the concentrated arbitration unit 55 is connected to an output of a second AND gate 57 whose first and second inputs are connected to outputs 58 and 59 of a first inverter 60 and a second inverter 61, respectively. A third input 62 of the second AND gate 57 and an input 63 of the first inverter 60 are the second input and third input, respectively, of the group of inputs and outputs of the system line arbiter 23 (FIG. 1) and are connected to the second input 32 and third input 33, respectively, of the group 30 of inputs and outputs of the single-chip microcomputer. A third input 64 (FIG. 2) and a fourth input 65 of the concentrated arbitration unit 55 are the first input and fourth input, respectively, of the group of inputs and outputs of the system line arbiter 23 (FIG. 1) and are connected to the first input 31 and fourth input 34, respectively, of the group 30 of inputs and outputs of the single-chip microcomputer.

Figure 2:
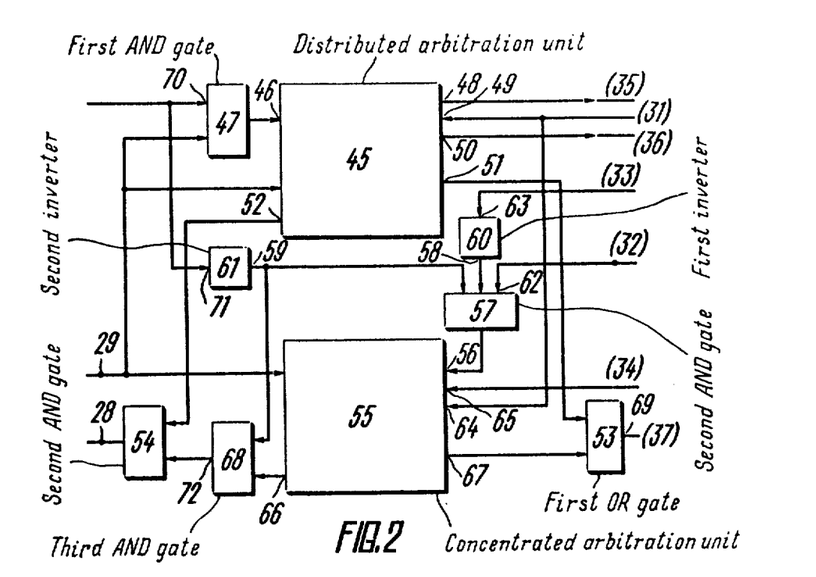
FIG. 2 is a functional diagram of a system line arbiter in accordance with the invention.

A first output 66 and a second output 67 of the concentrated arbitration unit 55 are connected to a first input of a third AND gate 68 and to a second input of the first OR gate 53. An output 69 of the first OR gate 53 is the third output of the group of inputs and outputs of the system line arbiter 23 (FIG. 1) and is connected to the third output 37 of the group 30 of inputs and outputs of the single-chip microcomputer.

The first input 29 of the system line arbiter 23 is connected to the first input of the first AND gate 47 (FIG. 2). The second input of the system line arbiter 23 (FIG. 1) is connected to a second input 70 (FIG. 2) of the first AND gate 47 and to an input 71 of the second inverter 61 whose output 59 is connected to a second input of the third AND gate 68. An output 72 of the third AND gate 68 is connected to a second input of the second OR gate 54 whose output is connected to the output 28 (FIG. 1) of the system line arbiter 23.

Figure 3:
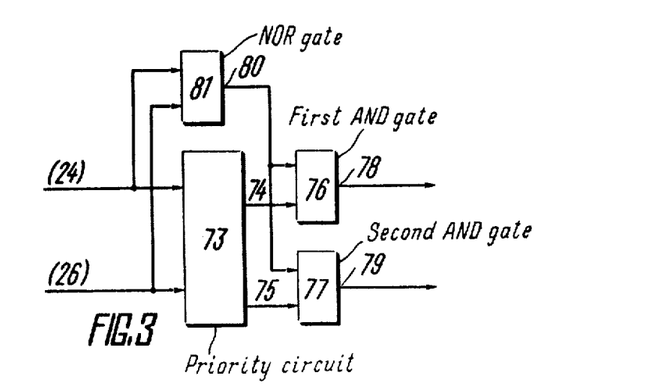
FIG. 3 is a functional diagram of a bus arbiter in accordance with the invention.

The bus arbiter 22 comprises a priority circuit 73 (FIG. 3) (cf. B. M. Kagan, M. M. Kanevsky, Tsifroviye vychislitelniye machiny i systemy/Digital Computers and Systems/, Energia Publishers, Moscow, 1974, pp. 466–467) whose first and second inputs are connected to the first input 24 (FIG. 1) and second input 26, respectively, of the bus arbiter 22. A first output 74 (FIG. 3) and a second output 75 of the priority circuit 73 are connected to first inputs of a first AND gate 76 and a second AND gate 77, respectively, whose respective outputs 78 and 79 are connected to the first output and second output, respectively, of the bus arbiter 22 (FIG. 1). Second inputs of the AND gates 76 (FIG. 3) and 77 are connected to an output 80 of a NOR gate 81 whose inputs are connected to the first input 24 and second input 26 of the bus arbiter 22 (FIG. 1).

The processor information exchange control unit 14 incorporates a first flip-flop 82 (FIG. 4) whose first input is the first input 17 (FIG. 1) of the unit 14. An output 83 (FIG. 4) of the first flip-flop 82 is the second output of the unit 14. The second input 25 of the unit 14 is a first input of a second flip-flop 84 (FIG. 4) whose output 85 is connected to an input of a delay circuit 86 and to a second input of the first flip-flop 82; the output 85 also serves as the first output, the second output and the input/output 21 (FIG. 1) of the processor information exchange control unit 14. An output 87 (FIG. 4) of the delay circuit 86 is connected to first inputs of three AND gates, 88, 89 and 90. Second inputs of the first AND gate 88 and second AND gate 89 are connected to the first input 17 of the processor information exchange control unit 14 (FIG. 1). Outputs of the AND gates 88 and 89 are connected to the first input 18 and the input/output 21 of the process information exchange control unit 14. The input/output 21 of the unit 14 is connected to a second input of the third AND gate 90 (FIG. 4) whose output 91 is connected to a second input of the second flip-flop 84.

Figure 5:
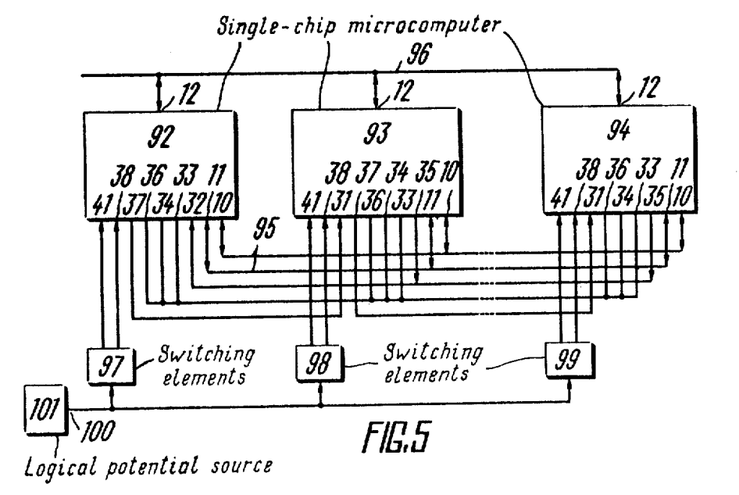
FIG. 5 is a general diagram of a multiprocessor system with a common memory field in accordance with the invention.

FIG. 5 is a diagram of a multiprocessor system with a common memory field. The system is composed of single-chip microcomputers 92, 93 and 94 whose first and second inputs/outputs 10 and 11 are combined and form a system line 95. The third inputs/outputs 12 of the microcomputers 92, 93 and 94 are combined into an I/0 bus 96. A "0" signal is applied from a first output of a first switching element 97 to the first input 38 of the first single-chip microcomputer 92. A "1" signal is applied from first outputs of switching elements 98 and 99 to the first inputs 38 of the single-chip microcomputers 93 and 94. A code representing the serial number of a single-chip microcomputer in the system is sent to the second inputs 41 of each of the microcomputers 92, 93 and 94 from second outputs of the switching elements 97, 98 and 99. Inputs of the switching elements 97, 98 and 99 are connected to an output 100 of a logic potential source 101. The third outputs 37 of the groups 30 (FIG. 1) of inputs and outputs of the single-chip microcomputers 92 (FIG. 5) and 93 are connected to the first input 31 of the group 30 (FIG. 1) of inputs and outputs of the next microcomputers 93 (FIG. 5) and 94, respectively. The first outputs 35 of the groups 30 (FIG. 1) of inputs and outputs of the single-chip microcomputers 93 (FIG. 5) and 94 are connected to the second input 32 of the group 30 (FIG. 1) of inputs and outputs of the first single-chip microcomputer 92 (FIG. 5). The third inputs 33, fourth inputs 34 and second outputs 36 of the groups 30 (FIG. 1) of all the single-chip microcomputers 92, 93 and 94 (FIG. 5) are combined.

The execution of a program stored in the memory unit 5 (FIG. 1) of the single-chip microcomputer is accompanied by an exchange of information between the memory unit 5 and processor 2 through the bidirectional bus 1. There are two types of exchange, namely, reading out information from the memory unit 5 and entering information into said unit 5.

The exchange is composed of three steps. The first step is to request the bidirectional bus 1 for an exchange cycle. The second step is the transmission of an address through the bidirectional bus 1 and the formation by the address comparator 15 of a unit selection signal. The third step is the transmission of data through the bidirectional bus 1 from the memory unit 5 to the processor 2 in the case of a read operation, or the transmission of data from the processor 2 to the memory unit 5 in the case of a record operation.

During the first step, the buffer storage cell 13 ensures temporary storage of the address; in the case of a record operation it also ensures temporary storage of the data. The address or data are stored until a settlement of a conflict is reached, whereupon the buffer storage cell 13 is controlled by the processor information exchange control unit 14 to transmit the address to the first input 16 of the comparator 15 and to the bidirectional bus 1. In the case of a read operation the buffer storage cell 13 transmits data through the bidirectional bus 1 to the operation execution unit 4; the transmission of data is reversed in the case of a record operation. The address comparator 15 compares the address with groups of addresses in the address space and produces a signal for the selection of a required microcomputer unit. The RAM groups of addresses in the address space contain 128 addresses; there are 1024 ROM addresses; there are 2 more addresses for the registers of the interface 6. If an address is not found in any of these groups, this means that it belongs to a peripheral device.

The groups of addresses in the address space are different for different codes arriving at the second input 25 of the address comparator 15. During the first step of information exchange, the first input 17 of the processor information exchange control unit 14 receives an exchange instruction transmitted from the computation process control unit 3, whereupon the unit 14 forms a request signal at the first input 24 of the bus arbiter 22.

The bus arbiter 22 sends an enabling signal, which signifies a permission to borrow an exchange cycle, to the second input 25 of the processor information exchange control unit 14, whereupon the latter forms a busy signal at its second output and forms signals at the first output 18, which control the read-out of the address from the buffer storage cell 13; the unit 14 also transmits a signal to the input/output 21, which accompanies the address transmission. After a period of time required to transmit the address through the bidirectional bus 1, the unit 14 starts the data transmission. For this purpose, it forms signals to control the buffer storage cell 13 at the first input 18, as well as data accompanying signals in the case of a record operation, or signals for the transmission of data from a selected unit in the case of a read operation. A response signal in the case of a record operation signifies the end of recording or the authenticity of the data transmitted; this signal is transmitted from the selected unit through the bidirectional bus 1 to the input/output 21 of the processor information exchange control unit 14, whereby the latter is brought back to its initial state. The bidirectional bus 1 is thus free for another exchange, and the bus arbiter 22 is ready to produce an enabling signal if there is a request for an exchange cycle at its inputs 24 and 26.

If the address applied to the first input 16 of the address dress comparator 15 does not coincide with any of the addresses contained in the groups of addresses, the comparator 15 forms a selection signal at the second input 44 of the unit 8 to control exchange of information through the system line, which signal controls the transmission of the address and data through the bidirectional bus 1 to the first input/output 10 of the single-chip microcomputer. The order of transmission and data accompanying signals are modified in accordance with the order of information exchange through the system line. Before the unit 8 to control exchange of information through the system line starts an exchange of information, it forms a request signal at the first output 29 of the system line arbiter 23. The latter is intended to solve conflicting situations on the system line by interacting with system line arbiters of the other single-chip microcomputers through the group 30 of inputs and outputs. The system line arbiter 23 operates in two modes. The first is effected by applying "0" or "1" to the second input of the system line arbiter 23. Upon settling a conflict, the unit 23 forms a signal to enable exchange of information through the system line; this signal is formed at the output 28 and transmitted to the first input of the unit 8 to control exchange of information through the system line. The memory unit 5 is also accessible from outside of the single-chip microcomputer. In order to gain access to the memory unit 5, an address is sent to the first input/output 10 of the single-chip microcomputer. The buffer storage cell 7 transmits this address to the first input 40 of the system line address comparator 39. The latter functions like the address comparator 15 and forms a signal to actuate a required unit of the singlechip microcomputer and the unit 8 to control exchange of information through the system line.

The unit 8 forms a signal for a cycle of exchange through the bidirectional bus 1. This signal is applied to the second input 26 of the bus arbiter 22. The latter settles conflicts which may arise between the processor 2 and the unit 8 to control exchange of information through the system line with regard to borrowing the bidirectional bus 1. Upon receiving an enabling signal from the bus arbiter 22, the unit 8 produces a sequence of control and accompanying signals in accordance with the algorithm of exchange through the bidirectional bus 1; the address and data proceed from the system line via the buffer storage cell 7.

Thus the bidirectional bus 1 is separated from the information lines of the processor 2 and is only used to allow access to the microcomputer's units to the processor 2 and to other means which can be connected to the system line so that they have direct access to the memory. All conflicts with regard to the use of the bidirectional bus 1 are settled by the bus arbiter 22. This helps reduce the amount of exchanges through the bidirectional bus 1 and provides for joint use of the latter. By carrying out a preliminary address analysis, the address comparator 15 and the system line address comparator 39 accelerate the exchange.

Consider now the functioning of some individual units in the course of data exchange.

During the first step of exchange, the first input 17 of the processor information exchange control unit 14 receives an exchange instruction. As a result, the first flip-flop 82 (FIG. 4) is brought to the "1" state. The signal from its output 83 is applied to the second input as a request for an exchange cycle. An enabling signal is applied to the second input 25 of the processor information exchange control unit (FIG. 1) and brings the second flip-flop 84 (FIG. 4) to the "1" state. The signal sent from the output 85 of the second flip-flop 84 resets the first flip-flop 82 and also serves as a signal to indicate whether the bidirectional bus 1 is busy or not; this signal is applied to the first output 18 and to the input/output 21 as a signal which controls the readout of the address from the buffer storage cell 13 (FIG. 1), as well as a signal which accompanies the address transmitted through the bidirectional bus 1. From the output 85 (FIG. 4) of the second flip-flop 84, the "1" signal is sent by the delay element 86 and after a certain time interval arrives at the inputs of the AND gates 88, 89 and 90. Depending on the exchange instruction, the first AND gate 88 forms a data control and accompanying signal for recording information, whereas the second AND gate 89 produces a signal to switch the buffer storage cell 13 (FIG. 1) and a readout identifier. A readiness signal is transmitted through the bidirectional bus 1 (FIG. 1) to the input of the third AND gate 90 (FIG. 4); this signal points to the end of entering information into the memory unit 5 or to the authenticity of information transmitted through the bidirectional bus 1. Upon the arrival of this signal, a signal is produced at the output 91 (FIG. 4) of the third AND gate 90, which resets the second flip-flop 84. Thus the exchange is completed and the bidirectional bus 1 (FIG. 1) is ready for another exchange cycle.

The bus arbiter 22 is intended to settle conflict situations on the bidirectional bus 1. Requests for an exchange cycle, which arrive at the first input 24 and second input 26 of the arbiter 22, proceed to the inputs of the priority circuit 73 (FIG. 3) which produces an enabling signal at one of its outputs 74 or 75 which send this enabling signal to the input of the AND gate 76 or 77, respectively. Arriving at the second input of the AND gate 76 or 77 is a signal from the output of the NOR gate 81; this latter signal signifies that the bus is free, i.e. that there are no busy signals. In the presence of at least one busy signal at the inputs of the NOR gate 81, the latter produces a logical zero at its output which inhibits the passage of an enabling signal to the outputs 78 and 79 of the AND gates 76 and 77, respectively. Thus an enabling signal produced at the output of the bus arbiter 22 (FIG. 1) is meant for a higher priority unit when the bidirectional bus 1 is free.

The system line arbiter 23 operates in two modes. When operation is in the first mode, a logical zero potential is applied to the second input of the arbiter 23. As this takes place, a request signal arriving at the first input 29 is not passed through the first AND gate 47 (FIG. 2), because there is "0" at the latter's second input 70, wherefore the distributed arbitration unit 45 cannot be put into operation. At the same time an enabling signal is transmitted from the second output 66 of the concentrated arbitration unit 55 via the third AND gate 68 and second OR gate 54 to the output 28 of the system line arbiter 23 (FIG. 1). A "1" signal at the output 59 (FIG. 2) of the second inverter 61 enables a passage of signals via the second AND gate 57 to the first input 56 of the concentrated arbitration unit, whereby the latter is rendered operable. When operating in the second mode, a logical unity potential is applied to the second input of the system line arbiter 23 (FIG. 1), and a request to borrow an exchange cycle on the system line is transmitted via the first AND gate 47 (FIG. 2) to the first input 46 of the distributed arbitration unit 45. Upon settling conflicts on the system line, the distributed arbitration unit 45 forms an enabling signal at its fourth output 52, which signal is applied via the second OR gate 54 to the output 28 of the system line arbiter 23 (FIG. 1). Besides, the second inverter 61 forms a logical zero signal at the second inputs of the second AND gate 57 (FIG. 2) and third AND gate 68. Thus the functioning of the concentrated arbitration unit 55 is inhibited.

Time plots pertaining to operation of the distributed arbitration unit 45 and concentrated arbitration unit 55 are thoroughly analyzed in the above-mentioned literature (cf. Microcomputer Handbook, 1976, by Digital Equipment Corporation, Maynard, Mass., pp. 4—13, 4—14, 4—52, 4—53).

The hardware of a single-chip microcomputer according to the invention displays a maximum efficiency if several microcomputers are integrated into a multiprocessor computing system with a common memory field.

The processors 2 (FIG. 1) of the single-chip microcomputers 92 (FIG. 5), 93 and 94 incorporated in such a system jointly execute a program stored by the memory units 5 (FIG. 1). If one of the processors 2 calls its own memory unit 5, it borrows an exchange cycle only on its own bidirectional bus 1. If it calls the memory unit 5 of another single-chip microcomputer, it is done through the system line 95, in which case the address transmitted through the system line 95 is applied to the first inputs 40 (FIG. 1) of the system line address comparators of the other single-chip microcomputers. Upon a comparison of this address with a predetermined one, the memory unit 5 of another single-chip microcomputer is called through the bidirectional bus 1 of that microcomputer. The order of calling is determined by the bus arbiter 22. The order of calling the system line 95 (FIG. 5) is determined as a result of interaction of the system line arbiters 23 (FIG. 1). A microcomputer with the concentrated arbitration unit 55 in operation (FIG. 2) is the main microcomputer on the system line 95 (FIG. 5) unless the system line is busy and there are requests from the other microcomputers. This main microcomputer is free to carry out an exchange through the system line without having first to clarify the situation. In the case of a microcomputer with the distributed arbitration unit 45 (FIG. 2) in operation, an exchange through the system line 95 (FIG. 5) is preceded by forming a request which is transmitted to the group of microcomputer inputs and outputs on the system line. In such a case the concentrated arbitration unit 55 (FIG. 2) forms an enabling signal which is transmitted from the first single-chip microcomputer 92 (FIG. 5) to the other microcomputer 92 (FIG. 5) to the other microcomputers 93 and 94.

Thus the priority is determined by the position of the microcomputer in the chain of microcomputers. The microcomputer, which does not call the system line, passes the enabling signal on to the next microcomputer until the enabling signal arrives at a microcomputer which indeed requests an exchange cycle. In order to avoid overlapping of the address spaces of microcomputers, a code of a microcomputer's number is applied to the second input of the address comparator 15 (FIG. 1) and to the second input of the system line address comparator 39; this code serves to select address groups in the memory unit. In solving some problems, a multiprocessor system composed of the single-chip microcomputers 92, 93 and 94 displays a capacity which is proportional to the number of single-chip microcomputers contained in the system, because no conflicting situations arise if a microcomputer calls its own memory unit. When calling the memory units of other microcomputers, conflicts are settled at two levels. The selection of a main microcomputer on the system line 95 optimizes the use of the system line 95. The possiblity of varying the address field of a single-chip microcomputer by applying a microcomputer number code makes it possible to use identical single-chip microcomputers, which accounts for an increasing demand for such microcomputers and thus cuts down their price. In addition, the system line 95 allows a connection of additional memory units to the system. The memory capacity thus can be brought to 64K words, which substantially expands the potentialities of the system.

To summarize, the present invention provides a versatile single-chip microcomputer and makes it possible to combine several such microcomputers into a high-capacity system with a common memory field.

What is claimed is:

1. For use in a multi micro-computer system, a single-chip micro-computer having a first input, a second input, a first input/output, a second input/output, a third input/output, and a group of inputs and outputs, comprising:

a processor for data processing:
an operation execution unit of said processor, an input/output of said operation execution unit;
a computation process control unit of said processor connected to said operation execution unit of said processor for decoding instructions and generating a sequence of control micro-instructions; an output of said computation process control unit;
a memory unit; an input of said memory unit;
an interface connecting the single-chip micro-computer to peripheral devices; an input/output of said interface which is said third input/output of said single-chip micro-computer; an input of said interface;
a buffer storage cell; an output and a control input of said buffer storage cell; an input/output of said buffer storage cell which is said first input/output of said single-chip micro-computer;
a bidirectional bus;
a unit to control exchange of information transmitted through a system line for forming signals to control said buffer storage cell and determine the order in which exchange of information is carried out through said bidirectional bus and said system line; a first input, a second input, a third input, a first output, a second output and a third output of said unit to control exchange of information transmitted through the system line; a first input/output of said unit to control exchange of information transmitted through the system line which is said second input/output of the single-chip micro-computer;
said bidirectional bus interconnecting said processor, said memory unit, said interface, said buffer storage cell and said unit to control exchange of information transmitted through the system line;
said first output of said unit to control exchange of information transmitted through the system line being connected to said control unit of said buffer storage cell;
the improvement consisting in that said processor contains:
a buffer storage cell of the processor for temporarily storing and transmitting of data and data addresses through said bidirectional bus to said first input/output of the single-chip micro-computer; a control input of said buffer storage cell of said processor; a first input/output of said buffer storage cell of said processor connected to said input/output of said operation execution unit; a second input/output of said buffer storage cell of said processor connected to said bidirectional bus;
a processor information exchange control unit to control said buffer storage cell of said processor and to form data and data address accompanying signals and identifiers to be transmitted through said bidirectional bus according to an exchange instruction formed by said computation process control unit; a first input, a second input, a first output and a second output of said information exchange control unit; and input/output of said processor information exchange control unit connected to said bidirectional bus;
an address comparator to select units of said single-chip micro-computer according to an address stored by said buffer storage cell of said processor, said address comparator having a first input connected to said buffer storage cell of said processor; a second input of said address comparator;
said output of said computation process control unit being connected to said first input of said processor information exchange control unit; said first output of said processor information exchange control unit being connected to said control input of said buffer storage cell of said processor;
said single-chip micro-computer further containing:
a bus arbiter to select a priority unit which requests for a cycle of exchange through said bidirectional bus and to form at its outputs enabling signals to borrow an exchange cycle on said bidirectional bus, said bus arbiter being connected to said second output of said processor information exchange control unit and to said second output of said unit to control exchange of information transmitted through the system line, a first input and a first output of said bus arbiter connected to second output and second input, respectively, of said processor information exchange control unit; a second input and a second output of said bus arbiter connected to said second output and said second input, respectively, of said unit to control exchange of information transmitted through the system line;
a system line arbiter to resolve conflicts between the micro-computers when reference is made to the system line; a first input and a first output of said system line arbiter connected to said third output and said second input of said unit to control exchange of information transmitted through the system line; a second input of said system line arbiter which is said first input of said single-chip micro-computer;
a group of inputs and outputs of said system line arbiter which is said group of inputs and outputs of said single-chip micro-computer; a first input, a second input, a third input, a fourth input, a first output, a second output and a third output of said group of inputs and outputs of said system line arbiter;
a system line address comparator to select units of said single-chip micro-computer according to an address stored by said buffer storage cell; a first input of said system line address comparator connected to said output of said buffer storage cell; a second input of said system line address comparator, combined with said second input of said address comparator and connected to said input of said memory unit, to said input of said interface and to said third input of said unit to control exchange of information transmitted through the system line.

2. A single-chip micro-computer as claimed in claim 1, wherein said system line arbiter comprises:

a distributed arbitration unit for resolving conflicts between the micro-computers when reference is made to the system line in the case when a micro-computer is the main one in the system; a first input of said distributed arbitration unit which is said first input of said system line arbiter; a second input of said distributed arbitration unit; a first output of said distributed arbitration unit which is said first output of said group of inputs and outputs of said system line arbiter; a second output of said distributed arbitration unit which is said second output of said group of inputs and outputs of said system line arbiter; a second input, a third output and a fourth output of said distributed arbitration unit; a third input of said distributed arbitration unit which is said first input of said group of inputs and outputs of said system line arbiter;

a first AND gate; an output of said first AND gate connected to said second input of said distributed arbitration unit; a first input of said first AND gate connected to said first input of said system line arbiter; a second input of said first AND circuit connected to said second input of said system line arbiter;

a first OR gate; a first input of said first OR gate; a second input of said first OR gate; an output of said first OR gate which is said third output of said group of inputs and outputs of said system line arbiter;

a second OR gate; a first input of said second OR gate; a second input of said second OR gate; an output of said second OR gate which is said first output of said system line arbiter;

said third output of said distributed arbitration unit and fourth output of said distributed arbitration unit being connected to said first input of said first OR gate and to said first input of said second OR gate, respectively:

a concentrated arbitration unit to resolve conflicts between the micro-computers when reference is made to the system line when a micro-computer is the main one in the system; a first input of said concentrated arbitration unit which is said first input of said system line arbiter; a second input and a first output of said concentrated arbitration unit; a second output of said concentrated arbitration unit connected to said second input of said first OR gate;

a third input and a fourth input of said concentrated arbitration unit which are said first an said fourth inputs, respectively, of said group of inputs and outputs of said system line arbiter;

a second AND gate; an output of said second AND gate connected to said second input of said concentrated arbitration unit; a first input and a second input of said second AND gate; a third input of said second AND gate which is said second input of said groups of inputs and outputs of said system line arbiter;

a first inverter; an output of said first inverter connected to said first input of said second AND gate; an input of said first inverter which is said third input of said group of inputs and outputs of said system line arbiter;

a second inverter; an output of said second inverter connected to said second input of second AND gate; an input of said second inverter connected to said second input of said system line arbiter;

a third AND gate; a first input of said third AND gate connected to said first output of said concentrated arbitration unit; a second input of said third AND gate connected to said output of said second inverter; an output of said third AND gate connected to said second input of said second OR gate.

3. A single-chip micro-computer as claimed in claim 1, wherein said bus arbiter comprises:

a priority circuit; a first input and a second input of said priority circuit connected to said first input and second second input, respectively, of said bus arbiter; a first output and a second output of said priority circuit;

a first AND gate; a first input of said first AND gate connected to said first output of said priority circuit; a second input of said first AND gate; an output of said first AND gate connected to said first output of said bus arbiter;

a second AND gate; a first input of said second AND gate connected to said second output of said priority circuit, said priority circuit producing enabling signals to one of said first and second AND gates; an output of said second AND gate connected to said second output of said bus arbiter; a second input of said second AND circuit;

a NOR gate inputs of said NOR gate, connected to said first input and second input of said bus arbiter; an output of said NOR gate connected to said second input of said first AND gate and to said second input of said second AND gate.

4. A single-chip micro-computer as claimed in claim 1, wherein said processor information exchange control unit comprises:

a flip-flop; a first input of said flip-flop which is said first input of said processor information exchange control unit; an output of said first flip-flop which is said second output of said processor information exchange control unit; a second input of said first flip-flop;

a second flip-flop; a first input of said second flip-flop which is said second input of said processor information exchange control unit; a second input of said second flip-flop; an output of said second flip-flop connected to said second input of said first flip-flop and being said first output, said second output and said input/output of said processor information exchange control unit;

a delay circuit; an input of said delay circuit connected to said output of said second flip-flop; an output of said delay circuit;

a first AND gate; a first input of said first AND gate connected to said output of said delay circuit; a second input of said first AND gate connected to said first input of said processor information exchange control unit; an output of said first AND gate, connected to said first output and to said input/output of said processor information exchange control unit;

a second AND gate; a first input of said second AND gate connected to said output of said delay circuit; a second input of said second AND gate connected to said first input of said processor information exchange control unit; an output of said second AND gate connected to said first output and to said input/output of said processor information exchange control unit;

a third AND gate; a first input of said third AND gate connected to said output of said delay circuit; a second input of said third AND circuit connected to said input/output of said processor information exchange control unit; an output of said third AND gate connected to said second input of said second flip-flop.

* * * * *